Nov. 11, 1969     A. GROSJEAN     3,477,777

LOCKING DEVICE FOR AN ADJUSTABLE OPTICAL ELEMENT

Filed Oct. 23, 1967

INVENTOR

ARNOLD GROSJEAN

BY    *Emory L. Groff Jr.*

ATTORNEY

United States Patent Office 3,477,777
Patented Nov. 11, 1969

3,477,777
LOCKING DEVICE FOR AN ADJUSTABLE OPTICAL ELEMENT
Arnold Grosjean, Yverdon, Switzerland, assignor to Paillard S.A., Sainte-Croix, Vaud, Switzerland, a corporation of Switzerland
Filed Oct. 23, 1967, Ser. No. 677,345
Claims priority, application Switzerland, Nov. 3, 1966, 15,968/66
Int. Cl. G02b 7/02
U.S. Cl. 350—255                            2 Claims

ABSTRACT OF THE DISCLOSURE

A locking device for adjustable optical elements has a locking member in the form of an annular disc which can clamp the adjusting ring of the optical element against a wedging surface rigidly attached to the fixed part of the mounting, so as to retain it in a desired position of focusing. The adjusting ring has an outer bearing surface against which the disc can clamp by radial displacement, provided by means of a ramp on an edge of the disc arranged to wedge against the wedging surface. The clamping action of the disc may be exerted by two peripherally separated surfaces.

---

Figures 1, 2:
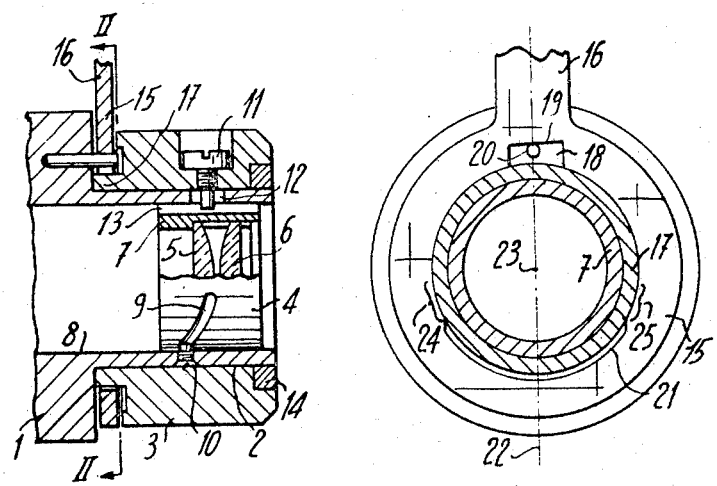

This invention relates to locking devices for adjustable optical elements.

Locking devices for an adjustable optical element are already known, of which the position is modified by rotation of a revolving ring having a cylindrical inner surface supported on a cylindrical surface of a fixed part, a locking member coperating with the ring and the fixed part to exert a pressure on the ring and lock it in rotation. However, these devices are seldom used, since they unduly complicate the mounting of the adjustable optical element.

It is an object of the present invention to provide a very simple construction for such a locking device which may be adopted without appreciably increasing in cost the mount of the optical system.

It is another object of the invention to provide an adjustable optical element comprising an improved locking device.

It is a further object to provide an optical instrument comprising such an improved locking device.

According to the invention, this device is characterized in that the ring has a bearing surface turned towards the exterior, the locking member being constituting by a ring mounted on this bearing surface and having a ramp cooperating with a surface integral with the fixed part, so that a rotation of the said locking member causes a decentering of the latter which forces it against the said bearing surface.

In order that the invention may be more clearly understood, one embodiment of the device according to the invention is described below purely by way of illustrative example, with reference to the accompanying drawing in which:

FIG. 1 shows a partial longitudinal section through an adjustable optical element comprising a locking device according to the invention; and FIG. 2 is a transverse section along the line II—II of FIG. 1.

The drawing shows an adjustable eyepiece carried by a fixed mount 1. The end of this fixed mount has a cylindrical surface 2 around which pivots a rotatable control ring 3 for a movable optical group 4. The latter is formed by two lenses 5 and 6 fixed in a sleeve 7 capable of turning and sliding in a cylindrical hole 8 of the mount 1.

The axial displacement of the eyepiece 4, to permit the desired focusing is obtained by means of a helical groove 9 in the sleeve 7 and by a screw 10 engaged in a corresponding threaded hole of the mount 1, the end of said screw penetrating into the groove 9. Thus, in making the sleeve 7 turn in the hole 8 of the mount 1, there is achieved an axial displacement of the optical assembly 4.

The angular displacements of the sleeve 7 are controlled by the control ring 3 which is coupled to said sleeve by a screw 11 the end of which the end passes through an arcuate slot 12 in the end of the mount 1 to be engaged in a longitudinal groove 13 in the sleeve 7. The control ring 3 is retained on the cylindrical end of the mount by a spring ring 14 secured thereto.

The locking device of the eyepiece comprises a locking member 15 in the form of a disc the periphery of which carries an extension 16 enabling the user to rotate the disc 15 manually.

The inner edge of the disc 15 is supported on a bearing surface 17 of the control ring 3, so that the ring and the disc 15 have substantially the same axis of rotation. The inner edge of the disc 15 has a notch 18 the bottom 19 of which is straight and cooperates with a stud 20 forced into a corresponding hole of the fixed part 1. The bottom 19 is slightly inclined with respect to a radius passing through the middle of the notch 18, so that when the disc 15 is rotated in a clockwise direction with reference to FIG. 2, the bottom surface 19 cooperates with the stud 20 and tends to displace the disc 15 upwardly with reference to the drawing.

The inner edge of the disc 15 has, on the opposite side of the notch 18, a second notch 21. The notch 21 extends on both sides of a straight line 22 passing through the center of rotation 23 of the control ring 3 and parallel to the direction of decentering of the disc 15 caused by the action of the stud 20 on the bottom surface 19 of the notch 18. In this way, the thrust of the stud 20 against the bottom surface 19 is balanced by the supporting pressure of the bearing surface 17 against the two surfaces 24 and 25 arranged on both sides of the straight line 22. As these two supporting surfaces have a general plane slightly inclined with respect to the straight line 22, they enable high supporting pressure to be achieved for a relatively light pressure between the stud 20 and the bottom surface 19 of the notch 18.

Of course, numerous modifications of the device shown can be envisaged and, in particular, the ramp causing the decentering of the disc 15 could be provided on the outer circumference of the disc 15, or again on the fixed part 1, and the disc 15 would then have a projection cooperating with the ramp. Similarly, the locking member need not necessarily comprise a disc concentric with the control ring, and it could very well be a small lever pivoted on the outside of the ring and have one end in the form of an eccentric to clamp the ring to lock it in position.

I claim:
1. In a locking device for an adjustable optical element, the position of which is modified by the rotation of a revolvable ring, said ring having a cylindrical inner surface resting on a cylindrical surface of a fixed mounting member, a locking member cooperating with said ring and said fixed mounting member so as to exert pressure on said ring and prevent its rotation, the improvement wherein said locking member comprises a washer mounted on a bearing surface of said ring, the inner edge of said washer having a single arcuate recess of less than 180° and a slot having a sloping surface, said recess and said slot being diametrically opposed to each other, said washer also having two clamping surfaces adjacent said arcuate recess, the locking operation between said washer and said ring being ensured by the coopera- tion between said sloping surface in the slot and a stud integral with said fixed mounting member, whereby said optical element is locked by the action of said clamping surfaces on the bearing surface of the ring.

2. A locking device according to claim 1, wherein said sloping surface comprises the straight bottom wall of said slot.

References Cited

UNITED STATES PATENTS 2,032,866  3/1936  Black _____ 350—257

FOREIGN PATENTS 491,879  3/1954  Italy.
736,218  11/1932  France.

DAVID SCHONBERG, Primary Examiner

MICHAEL J. TOKAR, Assistant Examiner

U.S. Cl. X.R.

74—531; 285—194